United States Patent
Cordery

(10) Patent No.: US 7,206,433 B2
(45) Date of Patent: Apr. 17, 2007

(54) METHOD FOR PRINTING HIGH INFORMATION DENSITY MACHINE-READABLE COMPOSITE IMAGES

(75) Inventor: Robert A Cordery, Danbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 961 days.

(21) Appl. No.: 10/331,820

(22) Filed: Dec. 30, 2002

(65) Prior Publication Data

US 2004/0125413 A1 Jul. 1, 2004

(51) Int. Cl.
*G06K 9/00* (2006.01)

(52) U.S. Cl. .................................. 382/101

(58) Field of Classification Search ........ 382/100–102; 358/1.15–1.18, 3.28, 2.1, 1.11, 1.2, 1.9; 347/101, 347/100, 95–98, 86; 106/31.14, 31.15; 252/301.16; 400/103, 104; 235/462.08–462.09, 491, 235/487, 468–469; 250/271
See application file for complete search history.

(56) References Cited

U.S. PATENT DOCUMENTS

| | | | |
|---|---|---|---|
| 5,837,042 A | 11/1998 | Lent et al. | 106/31.14 |
| 5,871,288 A * | 2/1999 | Ryan et al. | 400/103 |
| 6,106,110 A * | 8/2000 | Gundjian et al. | 347/86 |
| 6,402,986 B1 | 6/2002 | Jones, II et al. | 252/301.16 |
| 6,902,265 B2 * | 6/2005 | Critelli et al. | 347/101 |
| 6,948,660 B2 * | 9/2005 | Critelli et al. | 235/462.08 |

OTHER PUBLICATIONS

Information-Based Indicia Program (IBIP)—Performance Criteria For Information-Based Indicia And Security Architecture For Open IBI Postage Evidencing Systems (PCIBI-O) Draft, Feb. 23, 2000.

* cited by examiner

*Primary Examiner*—Ishrat Sherali
(74) *Attorney, Agent, or Firm*—Charles R. Malandra, Jr.; Angelo N. Chaclas

(57) ABSTRACT

A method for printing a large invisible luminescent bar code on a mail piece addresses the problem of obscuration of modules by printed text such as the address. The bar code is printed large enough so that the line width of the characters is substantially less than the module size of the bar code components. Overprinting does not then completely obscure any module and so the bar code is still readable. The readability is especially enhanced by the high contrast of the luminescent image. When a fluorescent bar code is viewed under UV illumination, the bar code emits fluorescence in the areas of printed modules without text overprinted. Because the modules are wider than the text line width, the text does not completely obscure any module. The contrast of the bar code is reversed in fluorescence—that is, printed areas emit light.

8 Claims, 5 Drawing Sheets

Figure 9

```
COMPARING AVAILABLE MODULE SIZES FOR PRINTING A 2-D
BAR CODE TO PROVIDE A MACHINE-READABLE IMAGE
WHICH IS LARGELY INVISIBLE UNDER WHITE LIGHT BUT
FLUORESCES UNDER ILLUMINATION BY ULTRAVIOLET
LIGHT, TO AVAILABLE FONT SIZES AND STYLES FOR
PRINTING ADDRESS AND/OR POSTAGE INFORMATION
CONTAINING A HUMAN-READABLE IMAGE VIEWABLE
UNDER WHITE LIGHT
```

↓

```
BASED ON THE COMPARISON, SELECTING A COMBINATION
OF MODULE SIZE FOR PRINTING A 2-D BAR CODE AND FONT
SIZE AND STYLE FOR PRINTING ADDRESS AND/OR POSTAGE
INFORMATION TO PERMIT READING OF THE 2-D BAR CODE
TO A PREDETERMINED READABILITY RATE DESPITE THE
PRESENCE OF OVERLAP
```

↓

```
PRINTING ADDRESS AND/OR POSTAGE INFORMATION
CONTAINING BOTH A HUMAN-READABLE IMAGE VIEWABLE
UNDER WHITE LIGHT AND A MACHINE-READABLE IMAGE
THAT FLUORESCES UNDER ILLUMINATION BY ULTRAVIOLET
LIGHT
```

METHOD FOR PRINTING HIGH INFORMATION DENSITY MACHINE-READABLE COMPOSITE IMAGES

BACKGROUND OF THE INVENTION

This invention relates to printing composite images containing visible and invisible postage and address information that can contain large amounts of information. The composite image provides high information density in a highly reliable and visually pleasing form. This invention addresses the problem of obscuration of IBI modules by printed text intended for visual human reading, such as the address.

Postage evidencing information, including IBI images, is a significant feature of the Information-Based Indicia Program (IBIP) proposed by the United States Postal Service (USPS) as a distributed trusted system. The IBIP open systems for applying postage in addition to using a postage meter to mechanically print indicia on mailpieces. The IBIP requires printing high density, two-dimensional (2-D) bar codes, such as PDF417 bar codes, on mailpieces. The requirements for printing a PDF417 2-D bar code are set forth in The "Uniform Symbology Specification". The Postal Service expects the IBIP to provide cost-effective assurance of postage payment for each mailpiece processed. IBI images comprise certain human readable information and two-dimensional (2-D) bar code information, which can contain such assurance. There is a need for a high-density image format that includes both human readable and bar code information with high readability.

The USPS has published specifications for the IBIP as PERFORMANCE CRITERIA FOR INFORMATION BASED INDICIA PROGRAM, dated Feb. 23, 2000, and referred to herein as the "IBIP specifications". The IBIP includes interfacing user (customer), postal and vendor infrastructures, which are the system elements of the program. The term "postage evidencing information" is meant to include IBI images meeting the current IBIP specifications as well as alternative formats. The IBIP specifications require a minimum bar code read rate of 99.5% and place the responsibility on each IBIP vendor to meet this requirement.

The IBIP specifications permit large format IBI images, e.g., 2-D bar codes, but there are several practical limits to the use of images that overlap conventional address information. For example, if conventional address information overlaps with the IBI image, the IBI image could lose reliability and fall outside of Specifications.

The need for high resolution has posed significant technical challenges. Current systems are challenged to provide a suitable combination of convenience, acceptable appearance and high readability at high information densities. In U.S. Provisional Patent Application No. 60/392,996, to Michael J. Critelli, et al., there is described a system which enables printing large amounts of information on a mailpiece without causing the mailpiece to become unsightly due to the presence of too much printing in a small space. The system employs invisible ink or lightly colored ink for printing at least a portion of the bar code portions of the information. This system has the advantage that attempts to maximize print information in an invisible 2-D bar code will not affect the human readable portion. Including redundancy in the invisible 2-D bar code improves readability.

When using invisible, fluorescent ink for printing the 2-D bar code, the bar code will not obscure the human readable printed information, but the human readable printed information can obscure the bar code. Overlap of the 2-D bar code and the printed conventional human readable address information can diminish the readability of the 2-D bar code or other information to the extent that even error correction codes cannot obtain the required read rates. Typically, fluorescent inks irradiate in the red or infrared range when excited by ultraviolet light. But, because black and other dark visible inks tend to quench fluorescence, any overprinting of dark ink and a fluorescent ink can cause obscuration to the point of diminishing or destroying readability. Black ink will quench fluorescence even if the fluorescent ink is printed over the black ink. FIG. 6 shows obscured address information.

There remains a need for a method that provides machine-readable IBI images containing both large format 2-D bar code information in invisible or light colored luminescent ink, along with conventionally printed address and postage information to provide increased read rates and the provision of high information density without obscuring any one component. It would be desirable in this context to provide especially enhanced readability with a high contrast of the fluorescent image in a format that enabled improved read rates in the presence of obscured information.

BRIEF DESCRIPTION OF THE DRAWING

The invention will be better understood and its advantages will become more apparent from the following description, especially when read in light of the accompanying drawing, wherein:

FIG. 9 shows a process flow diagram for a process of printing composite images according to the invention.

SUMMARY OF THE INVENTION

Figure 1:
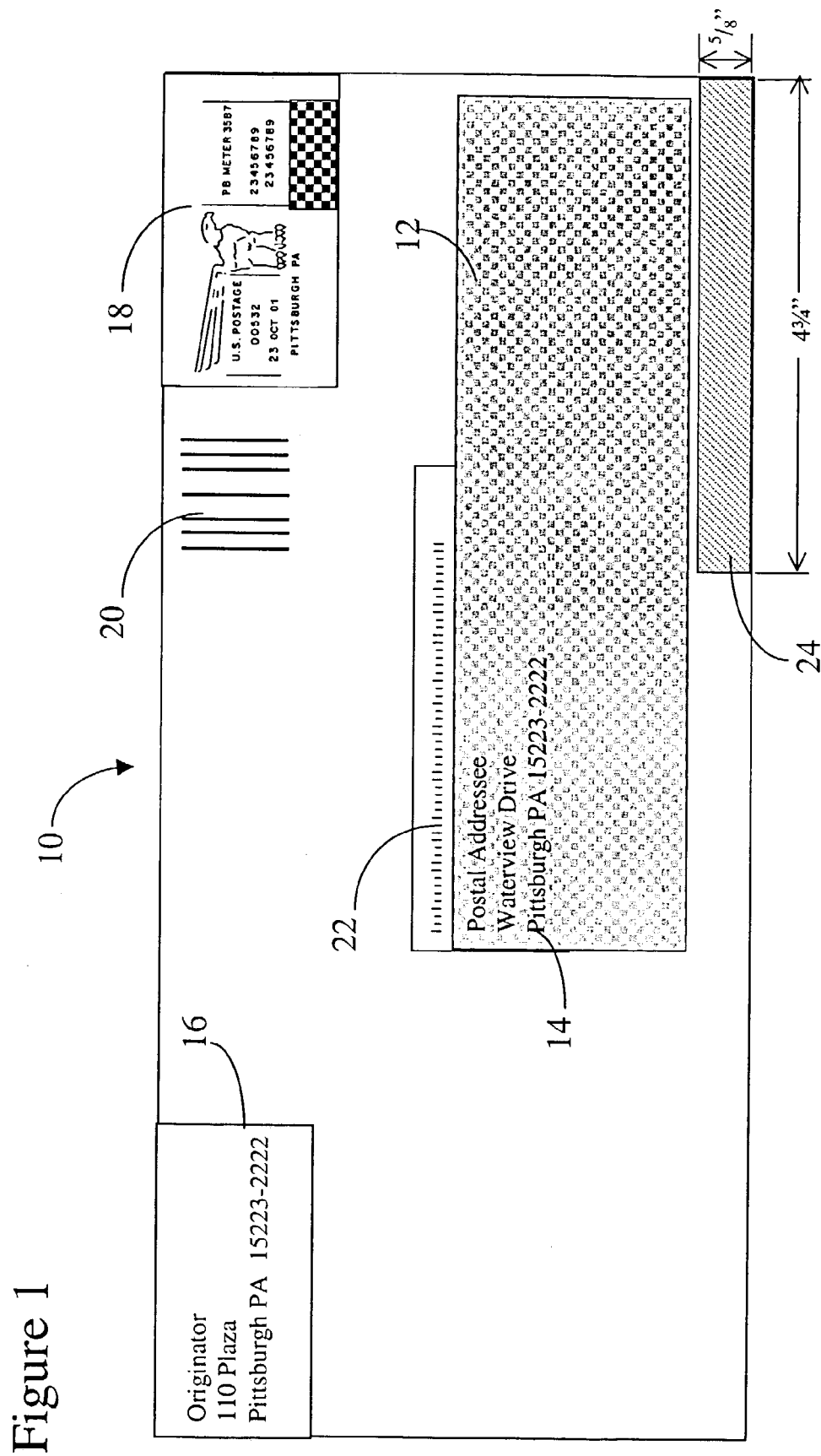
FIG. 1 is a schematic drawing illustrating a layout of a mailpiece including a 2-D bar code, which can be printed in invisible or light colored luminescent ink, along with conventionally printed address and postage information, typically printed in black ink, showing partial overlap of address and 2-D bar code information.

It is an object of the invention to provide a method for printing postal and other information with a high information density in a highly reliable and visually pleasing form.

It is another object of the invention to provide a method for printing composite images that can contain large amounts of information, including redundant information, in an eye-pleasing format.

It is another object of the invention to provide a method for printing composite images containing largely invisible, machine-readable postage-evidencing symbology and dark, visible images containing address and postage information in a format which permits overlap.

It is yet another object of the invention to provide a system that can produce machine-readable postage-evidencing symbology containing both large format 2-D bar code information and address information to provide increased read rates and the provision of high information density in a format which permits overlap without obscuring any one component.

These and other objects are accomplished by the invention, which provides improvements for printing and reading machine-readable postage-evidencing symbology and visible address information on a mailpiece.

In one aspect, the invention comprises a method for printing address and/or postage information containing both a human-readable image viewable under white light and a machine-readable luminescent, i.e., fluorescent or phosphorescent, image that emits light in a first wavelength range under illumination by second shorter wavelength light such as ultraviolet light, the method comprising the steps of: comparing available module sizes for printing a 2-D bar code to provide a machine-readable luminescent image which is largely invisible under white light, to available font sizes and styles for printing address and/or postage information containing a human-readable image viewable under white light; based on the determination, selecting a combination of module size for printing a 2-D bar code and font size and style for printing address and/or postage information to permit reading of the 2-D bar code to a predetermined readability rate despite the presence of overlap; printing address and/or postage information containing both a human-readable image viewable under white light and a machine-readable luminescent image. Fluorescence (or luminescence) can be excited by light other than ultraviolet. The constraint is that the radiated light is longer wavelength than the illuminating light.

In another aspect, the invention provides a method for reading printed address and/or postage information containing both a human-readable image viewable under white light and a machine-readable luminescent bar code image readable under illumination by shorter wavelength light, the method comprising the steps of: scanning the human-readable image, binarizing the scanned human-readable image by comparison with a threshold, scanning the bar code image, determining the bar code grid from the modules; and, for each module, averaging the luminescent image pixels over the fraction of that module which does not have visible printing, thus correcting for pixels where the luminescence is quenched by the visible printing, and determining module values by comparison of the weighted average with a threshold.

The method has a number of preferred aspects, many of which are described below and shown in the accompanying drawings.

DETAILED DESCRIPTION OF THE INVENTION

The invention relates to printing composite images that can contain large amounts of information on mailpieces, such as mailpiece 10 illustrated in FIG. 1, which employs exemplary IBI images comprising human readable information and two-dimensional (2-D) bar code information. The composite images, as will be explained in detail below, preferably include redundant information.

Referring to FIG. 1, there is shown a schematic drawing illustrating a layout of a mailpiece 10 including a 2-D bar code 12, which can be printed in invisible or light colored luminescent ink, along with conventionally printed address 14, 16 and postage information 18 and an optional Facing Identification Mark (FIM) 20, typically printed in black ink, showing partial overlap of address and 2-D bar code information.

The presence of an FIM 20 adds another level of complexity and is currently required by United States Postal Service IBI Specifications to be part of the IBI image so that the USPS Advanced Facer Canceller may detect the presence of an IBI mailpiece so as to sort the mailpiece properly. In the United States, the FIM is a pattern of vertical bars printed in the upper right portion of the mailpiece, to the left of the indicia. As currently specified, the United States Postal Service FIM is large, taking up approximately 20% of the proposed IBI image. An FIM uses a large amount of envelope space, which restricts the amount of information that can conveniently and neatly be presented in the IBI image. Accordingly, the space remaining for other 2-D bar code information is at a premium.

The address block 14 of a mailpiece is the primary source of address information and contains a human-readable address and preferably includes a Delivery Point Bar Code (DPBC), shown schematically as 22. A DPBC is formed by adding 10 bars (representing two additional digits) to a standard ZIP+4 code. The ZIP+4 code is a single field of 52 bars consisting of a frame bar, a series of 25 bars that represent the correction digit, and a final frame bar. The DPBC or other POSTNET (POSTal Numeric Encoding Technique) bar code can be printed just about anywhere on the address side of the mailpiece that is at least $\frac{1}{8}^{th}$ inch from any edge. Typically and preferably, it is printed in the upper portion of the address above the recipients name as shown in FIG. 1. Each letter-size piece in an automation rate mailing and each piece of upgradeable Presorted First-Class Mail or upgradeable Standard Mail, must have a barcode clear zone unless the piece bears a DPBC in the address block. Such a zone is thus required in the preferred embodiments herein and is illustrated as 24 in FIG. 1.

The net effect of providing large amounts of useful, required and optional, information in this standard format can be a visually unattractive mailpiece unless provision is made to provide it according to the invention or some other effective manner that the art has not yet enabled. When adopting an approach as in the above Critelli, et al., application, there remains a need to enable the overlap of visible and invisible print in a manner that enables high read rates for both.

The 2-D bar codes, schematically illustrated as 12, are codes capable of being read in the horizontal and vertical directions. To achieve this objective, they are comprised of arranged geometric modules, seen better as squares 122 in FIGS. 2–4 and other shapes in some of the other figures, capable of encoding digital information. Typically, the modules forming an image block are square and solidly imprinted, but can be of other effective configurations. As needed, 2-D bar codes can optionally be provided with information to provide a variety of needs, including for redundancy of postage or address information as well as security and validation codes.

Figure 2:
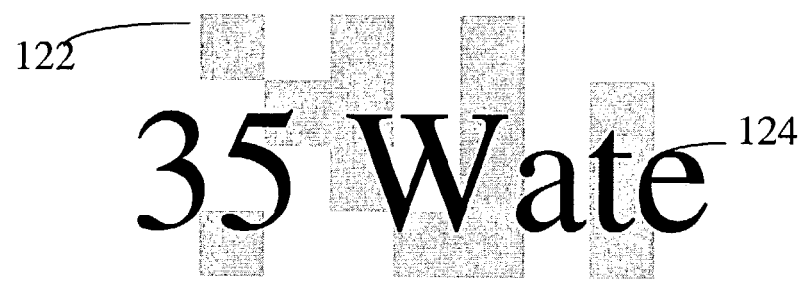
FIG. 2 is a schematic drawing illustrating a layout according to the invention wherein a bar code is printed in a predetermined format large enough relative to the print so that the line width of the characters is substantially less than the module size of a bar code element.

The exemplary 2-D bar code 12 arrangement printed on a mailpiece 10 in FIG. 1, is shown schematically in greater detail in FIG. 2 to be an arrangement of printed modules 122. For ease of illustration, printed squares are shown as dark squares and blank squares are shown as white squares. All such modules, both printed and blank, are oriented and arranged in an image block, e.g., 12, capable of including required, optional and redundant 2-D bar code information. The IBI or other images (e.g., for value added service data or other data not related to the indicium) according to the invention are preferably printed in invisible ink, but can be in light colored ink if desired. Thus, representation of the printed areas as dark areas in the Figures is for illustration only. By the term "redundant 2-D bar code" is meant a bar code containing information that is at least to some extent redundant with the information available on another printed field. The redundant 2-D bar code information can repeat information internally within itself and with information in the visible image.

The invention has particular applicability to open systems, such as based on personal computers, having the ability to print postage, but not being dedicated to that purpose, and the use of conventional ink jet printers. In an open system, the size of the envelope and the footprint of the images to be printed on the envelope (typically return address, recipient address, add slogan and postage) are known. The 2-D bar code images as illustrated as 12, are preferably printed with luminescent ink of the type described in the above-identified application of Critelli, et al., in U.S. Pat. No. 5,837,042, to Lent, et al. or other patents such as U.S. Pat. No. 6,402,986 to Jones II, et al., and are conveniently printed by ink jet print means. The system is designed to the greatest possible use of available real estate on an envelope by permitting a 2-D bar code printed with invisible ink to overlap human readable information when done in accord with the invention.

To maintain readability of all elements, the postage-evidencing information 18 cannot overlap with information in the address block 14 and or a barcode clear zone 24 when the piece bears a DPBC 22 in the address block 14. An optional FIM 20 can be printed with an ink having the correct wavelength for a facer-canceller. FIM 20 can be printed with an ink that is black in the visible wavelength range.

The invention provides an envelope that can be not only visually acceptable with high information density, the invention enables adding complexity without sacrificing readability. It is a distinct advantage of the invention that the composite images can optionally include redundant information to provide more "resiliency" to envelope damage or printing overlap. The invention can print a 2-D bar code including error correction coding, without concern for obscuration of the bar code and, thereby, enable maintenance of high read rates.

In one important aspect, the invention addresses a technology for preventing the obscuration of modules by printed text such as the address.

As illustrated in FIG. 2, a bar code according to the invention is made large enough so that the line width of the characters 124 is substantially less than the module size 122. In its broad sense, the line width will be sufficiently less than the minor dimension of a module, that modules are not obscured to the point that acceptable machine readability cannot be achieved. The read rates for required information may be higher than that for optional or redundant information, but should be over 50% in all cases. In others postal requirements or regulations may set high effective levels. It is an advantage of the invention that compliance with current regulations, which require this image to have a degree of resolution necessary to provide read rates in excess of 99.5%, can be facilitated. Effective line sizes of the characters 124 can be 25% smaller than the noted minor dimension, and preferably will be 50% or less the dimension of the minor dimension of an individual module 122. Overprinting does not then completely obscure any module and so the bar code is still readable. The readability is especially enhanced by the high contrast of the fluorescent image.

Figure 3:
FIG. 3 is a schematic drawing, which shows the 2-D bar code of FIG. 2 viewed under UV illumination.

FIG. 3 shows the bar code 12 of FIG. 1 viewed under UV illumination —revealed in the Figure as a negative of the image shown in FIG. 2. The bar code 12 emits fluorescence in the areas of printed modules without text overprinted. Because the modules are wider than the text line width, the text does not completely obscure any module. The contrast of the bar code 12 is reversed in fluorescence, that is printed areas emit light.

The bar code of FIG. 1 is large. Typically, as many modules will be printed as remain blank, meaning that the ink used must cover approximately 50% of the 2-D bar code area 12. The bar code 12 will thus require a large amount of ink. Printing dithered modules as in FIG. 4 can reduce the ink consumption. Preferably, the modules will be printed as composites of a large number of dots, e.g., 10 to 10,000, spaced such that ink savings of from 10 to 90% can be realized. The degree of dithering will be determined based on a number of factors, including print format, inks, module size and shape and font size and style for the human-readable portions. The 2-D image can still be read with dithering, because the modules are large and the contrast in fluorescence is high.

Figure 4:
FIG. 4 is a drawing showing dithered modules for a 2-D bar code of the type in FIG. 3, to reduce the ink consumption.
Figure 5:
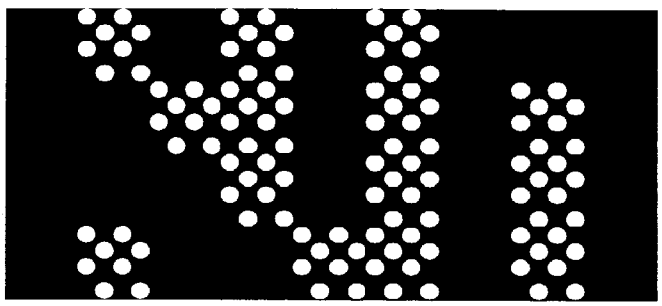
FIG. 5 shows the fluorescent image of a 2-D bar code as in FIG. 4 printed with dithered modules.
Figure 6:
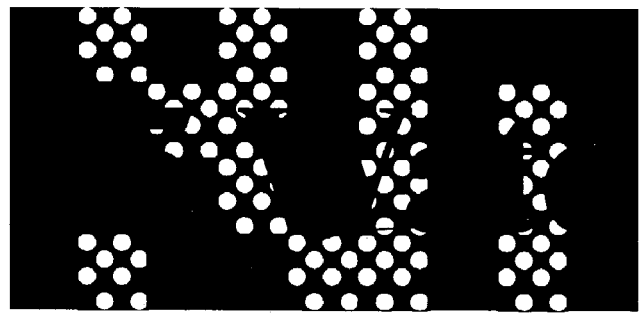
FIG. 6 shows the same bar code of FIG. 5, but partially obscured address information due to overprint.

FIG. 5 shows the fluorescent image of a bar code 12 as in FIG. 4 printed with dithered modules. It represents an ideal image of a bar code. FIG. 6 shows the same bar code partially obscured by overprint. Such partial obscuration, were the print of a larger size, would seriously affect readability. However, by predetermining the correct print size to match module size or module size to match print size, the invention permits overlap to maximize the utilization of available space, without sacrificing readability.

Figure 7:
FIG. 7 shows a bar code with elongated modules such as rectangular modules, which can further reduce the probability of a module of a 2-D bar code being largely obscured.

Square modules may not provide the optimum readability for the 2-D bar code 12. Depending on the type font style and size, some modules 122 may be largely covered by the overprinted text. Again, it is important that where obscured, the black or other dark ink used to print the intended visible information will tend to quench light emissions from the fluorescent ink upon illumination for reading. Print modules 122 should be utilized with a geometry that assures that the modules are not obscured by text. FIG. 7 shows a bar code with elongated modules such as rectangular modules 222, which can reduce the probability of a module 112 being largely obscured.

Figure 8:
FIG. 8 shows the bar code modules printed at a height equal to half the line spacing.

If the overprint text, e.g., address information 16, and the bar code are printed in a single operation, the bar code modules can be printed at twice the pitch of the text line spacing as in FIG. 8. The modules are preferably located so that each module is half within the printed line and half in the space between lines. 122 shows a representative bright luminescent area. The paper is not luminescent in the same range as the ink. The printed areas in the figure are the white areas. The luminescent printed areas that overlap the visible characters appear black because of quenching. Thus, each module is at least partially visible. The method provides for synchronized luminescent bar code and visible print locations.

A preferred method of the invention for printing address and/or postage information containing both a human-readable image viewable under white light and a machine-readable image that fluoresces under illumination by ultraviolet light, is illustrated schematically as a flow diagram in FIG. 9. As a first step in the process, available module sizes for printing a 2-D bar code to provide a machine-readable image which is largely invisible under white light but fluoresces under illumination by ultraviolet light, are compared to available font sizes and styles for printing address and/or postage information containing a human-readable image viewable under white light. Available module sizes will typically be within the range of from about 0.25 to about 10 mm and preferably from about 2 to about 6 mm in major and minor dimensions. The lower limit is determined by readability requirements and the upper limit is determined to allow sufficient data to be included in the bar code. Font sizes will be any of those typically available on a conventional word processor, e.g., from 6 to 24 font size. The font style is principally a matter of aesthetics, but should be chosen to achieve the desired line widths and readability. Based on the comparison, a combination of module size for printing a 2-D bar code and font size and style for printing address and/or postage information are selected to permit reading of the 2-D bar code to a predetermined readability rate despite the presence of overlap. Once the determinations have been made, address and/or postage information is printed containing both a human-readable image viewable under white light and a machine-readable image that fluoresces under illumination by ultraviolet light. If desired, a control check can be made and the results of the earlier selection modified in light of it. Computations, selections and comparisons are facilitated by a digital computer having suitable reference values stored, but can be assisted as need be or as is convenient by a skilled technician with knowledge of the necessary available information and result criteria.

Figure 10:
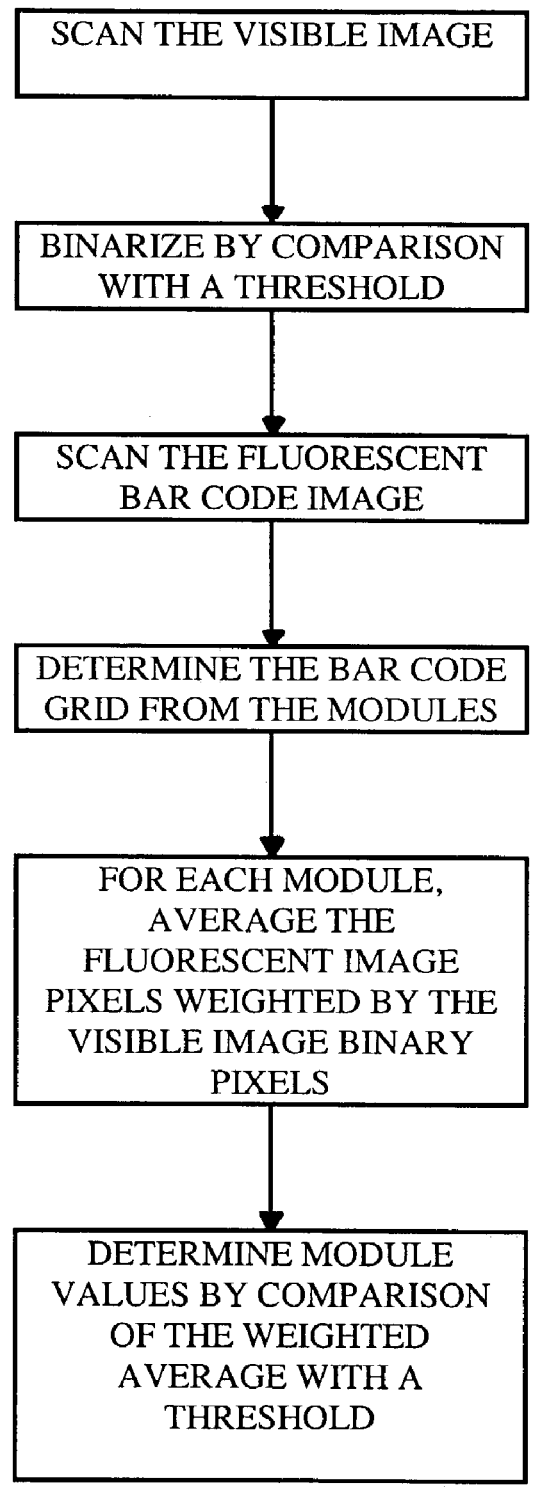
FIG. 10 shows a process flow diagram for a process of reading composite images according to the invention.

The information in a scan of the visible image in FIG. 2 and in the fluorescent image in FIG. 3 can be combined to improve the bar code reading. The visible image is scanned and a binary visible image is produced with 1 for a scanned white pixel and 0 for scanned black pixel. Each pixel in the scanned fluorescent image is weighted by the corresponding pixel in the binary visible image. The fluorescent image is averaged over the area of each module using the weighting factor from the binary scanned visible image. Thus, pixels that are overprinted are given zero weight, and the average is only over the pixels that are free from overprinting. The process for reading an image made in accord with the invention is shown as a representative flow diagram in FIG. 10. Again, computations, selections and comparisons are facilitated by a digital computer having suitable reference values stored, but can be assisted as need be or as is convenient by a skilled technician with knowledge of the necessary available information and result criteria.

The method of the invention for printing address and/or postage information containing both a human-readable image viewable under white light and a machine-readable image that fluoresces under illumination by ultraviolet light, is illustrated schematically as a flow diagram in FIG. 9.

The invention provides an envelope that can be more visually acceptable than standard, preferably while providing more information. Indeed, the invention enables adding complexity to the image to provide a large amount of information, while enabling printing in an eye-pleasing format. Moreover, mailpieces can advantageously be printed using conventional ink jet printers, e.g., of the type used to print color images from personal computers. The composite images of the invention provide high information density in a highly reliable and visually pleasing form and offer significant security features.

It is a distinct advantage of the invention that the composite images can optionally include redundant information to provide more "resiliency" to envelope damage. It can, by providing error correction coding, permit maintenance of high read rates despite damage to otherwise critical information. Thus, if a potion of the information in the machine-readable postage-evidencing symbology block becomes obscured due to poor printing or handling, the image can have redundant information available elsewhere in the image.

The above description is intended to enable the person skilled in the art to practice the invention. It is not intended to detail all of the possible modifications and variations which will become apparent to the skilled worker upon reading the description. It is intended, however, that all such modifications and variations be included within the scope of the invention which is seen in the above description and otherwise defined by the following claims. The claims are meant to cover the indicated elements and steps in any arrangement or sequence which is effective to meet the objectives intended for the invention, unless the context specifically indicates the contrary.

What is claimed is:

1. A method for printing address and/or postage information containing both a human-readable Image viewable under white light and a machine-readable luminescent Image that emits light .in a first wavelength range under illumination by second shorter wavelength light such as ultraviolet light, the method comprising the steps of:

comparing available module sizes for printing a 2-D bar code to provide a machine-readable luminescent Image which is largely invisible under white light, to available font sizes and styles for printing address and/or postage information containing a human-readable Image viewable under white light;

based on the determination, selecting a combination of module size for printing a 2-D bar code and font size and style for printing address and/or postage information to permit reading of the 2-D bar code to a predetermined readability rate despite the presence of overlap; and printing address and/or postage information containing both a human-readable image viewable under white light and a machine-readable luminescent image.

2. A method according to claim 1 wherein modules are square.

3. A method according to claim 1 wherein modules are rectangular.

4. A method according to claim 1 wherein line thickness for printing a font are selected to be at less than 50% the minor dimension of a module.

5. A method according to claim 1 wherein height of a font is selected to be at less than 50% the minor dimension of a module.

6. A method according to claim 1 wherein the modules are printed in dithered fashion to conserve ink.

7. A method according to claim 1 wherein the human-readable print is positioned to overlap two adjacent rows of modules comprised in the 2-D bar code.

8. A method according to claim 7, wherein the module height is half the line spacing.

* * * * *